United States Patent [19]

Patel

[11] 4,358,848
[45] Nov. 9, 1982

[54] DUAL FUNCTION ECC SYSTEM WITH BLOCK CHECK BYTE

[75] Inventor: Arvind M. Patel, San Jose, Calif.

[73] Assignee: International Business Machines Corporation, Armonk, N.Y.

[21] Appl. No.: 206,778

[22] Filed: Nov. 14, 1980

[51] Int. Cl.³ .............................................. G06F 11/10
[52] U.S. Cl. ......................................... 371/39; 371/38
[58] Field of Search ............................. 371/39, 37, 38

[56] References Cited

U.S. PATENT DOCUMENTS

| | | | |
|---|---|---|---|
| 3,487,362 | 12/1969 | Frey, Jr. | 371/39 |
| 3,638,182 | 1/1972 | Burton et al. | 371/39 |
| 3,742,449 | 6/1973 | Blair | 371/39 |
| 3,755,779 | 8/1973 | Price | 371/38 |
| 3,859,630 | 1/1975 | Bennett | 371/39 |

OTHER PUBLICATIONS

A. M. Patel, Dual–Function ECC Employing Two Check Bytes per Word, IBM Tech. Discl. Bulletin, vol. 24, No. 2, Jul. 1981, pp. 1002–1004.

Primary Examiner—Charles E. Atkinson
Attorney, Agent, or Firm—R. E. Cummins

[57] ABSTRACT

An improved ECC method and system are disclosed for correcting either a random single-bit error, or alternately, a multi-bit error in one byte of a data word from a single syndrome byte. The improvement involves determining the location of the multi-bit error in successive data words which result because of a failure in one of a plurality of failure independent storage units employed for storing a block of multi-byte words.

The location of the defective byte position is determined by summing each non-zero syndrome byte that is developed for each multi-byte word that is processed to produce a summed syndrome byte $\Sigma S \neq 0$. This summed syndrome byte is then employed to generate a set of vectors which are positionally related in an m-sequence to the summed syndrome byte. A block syndrome byte, developed during the processing of a number of words and representing the sum modulo-2 of the error pattern in each word of the block, is compared to each of the set of vectors. The position of the vector relative to the summed syndrome byte compared to the block syndrome byte then provides an indication of the byte position in each word which is in error. With the defective byte position identified, the individual syndrome bytes for each word are then employed to develop for each word the correct error pattern for the defective byte position of each word.

20 Claims, 14 Drawing Figures

ERROR LOG

| WORD # | WORD PROCESSING MODE ||| BLOCK PROCESSING MODE ||
|---|---|---|---|---|---|
| | 2 NON-ZERO SYNDROME | 3 SB ERROR PATTERN | 4 BYTE POSITION | 5 BYTE CORRECTED | 6 DEVELOPED ERROR PATTERN | 7 DEFECTIVE BYTE POSITION |
| W 39 | ΣS≠0 | ΣSBE | | | | |

BLOCK PARITYS DEFECTIVE (14–15)

BLOCK PARITYS – ΣS≠0 – SBE

DUAL FUNCTION ECC SYSTEM WITH BLOCK CHECK BYTE

DESCRIPTION

1. Technical Field

This invention relates in general to dual function error correcting systems for alternately correcting from a single syndrome byte a random single-bit error in a data word or a multi-bit error in one byte of a data word when the location of the defective byte position is known. More specifically, the invention relates to a system for determining the location of the defective byte in the data word to permit generating the correct error pattern for each byte and to validate the corrections made to single random 1-bit errors in one or more of a predetermined number of data words.

2. Related U.S. Application

U.S. application Ser. No. 206,779, assigned to the assignee of the present invention and filed concurrently herewith, discloses a dual function ECC system which requires the location of the defective byte position in a data word to be provided in order for different patterns of multi-bit errors in the same defective type position to be corrected. The defective byte position is identified in that system from a byte parity vector register which requires each byte of data being processed to store one parity bit. The present application is directed to a method and system for identifying the defective byte location without using a parity bit for each byte.

BACKGROUND OF THE INVENTION

The dual function ECC system described and claimed in the above-identified application functions to alternately correct a single random 1-bit error in a data word having M-1 data byte positions and one check type position, or a multi-bit error in one byte position where the defective byte position in the data word is known.

The location of the defective byte position is determined by generating an M bit word parity vector for each M byte word. The M bit vector is generated by checking each byte of the word for parity by generating a parity bit which is stored with the byte and parity checking the byte as it is read from storage. If an error occurs in the data byte between the time it is stored and read out, the parity bit will indicate a single-bit error 100% of the time and a multi-bit error in the byte only 50% of the time. However, if it is assumed that multi-bit errors result only from a component failing in the system, the same byte position of each data word will be affected since each byte of the word has been stored in a different failure independent memory unit. The M bit vectors that are generated after a unit fails will, therefore, provide sufficient data to conclude on a probability basis that a specific unit has failed.

The above arrangement for determining the defective byte location operates quite satisfactorily but requires that the storage unit have the capacity to store one additional data bit for each byte. If conventional 8-bit bytes are employed, the capacity of the unit for storing user data is reduced by about 12%.

The present invention is directed to a dual function ECC method and system which requires the memory to store only one additional 8-bit byte for a relatively large number of data words (for example, 40 or more) where each data word still only includes one check byte position, as in the system of the above related disclosure. The one additional byte, referred to as a block parity byte, permits the defective byte position to be identified when processed by the improved system and method of the present invention.

It is, therefore, an object of the present invention to provide an improved dual function ECC system.

Another object of the present invention is to provide a dual function ECC system for a memory which requires only a minimum of storage space in the memory for ECC information.

A further object of the present invention is to provide an improved dual function ECC system which requires only one additional byte position for a relatively large number of multi-byte data words.

A still further object of the present invention is to provide in a dual function ECC system an improved method for determining the location of a defective byte position in a data word to permit the appropriate multi-bit error pattern to be developed for each word from their associated dual function single syndrome bytes.

Other objects and advantages will be apparent from the following description of a preferred embodiment of the invention as illustrated in the accompanying drawings.

BRIEF DESCRIPTION OF THE DRAWINGS

FIG. 2a is a table showing the hexadecimal to 4-bit binary pattern conversion for the hexadecimal characters employed in the parity check table of FIG. 2;

FIG. 3 is a parity check matrix H' which has been systematically developed from the parity check matrix of FIG. 2;

FIG. 8b illustrates the layout of the error log shown in FIG. 1;

DESCRIPTION OF THE INVENTION

Figure 1:
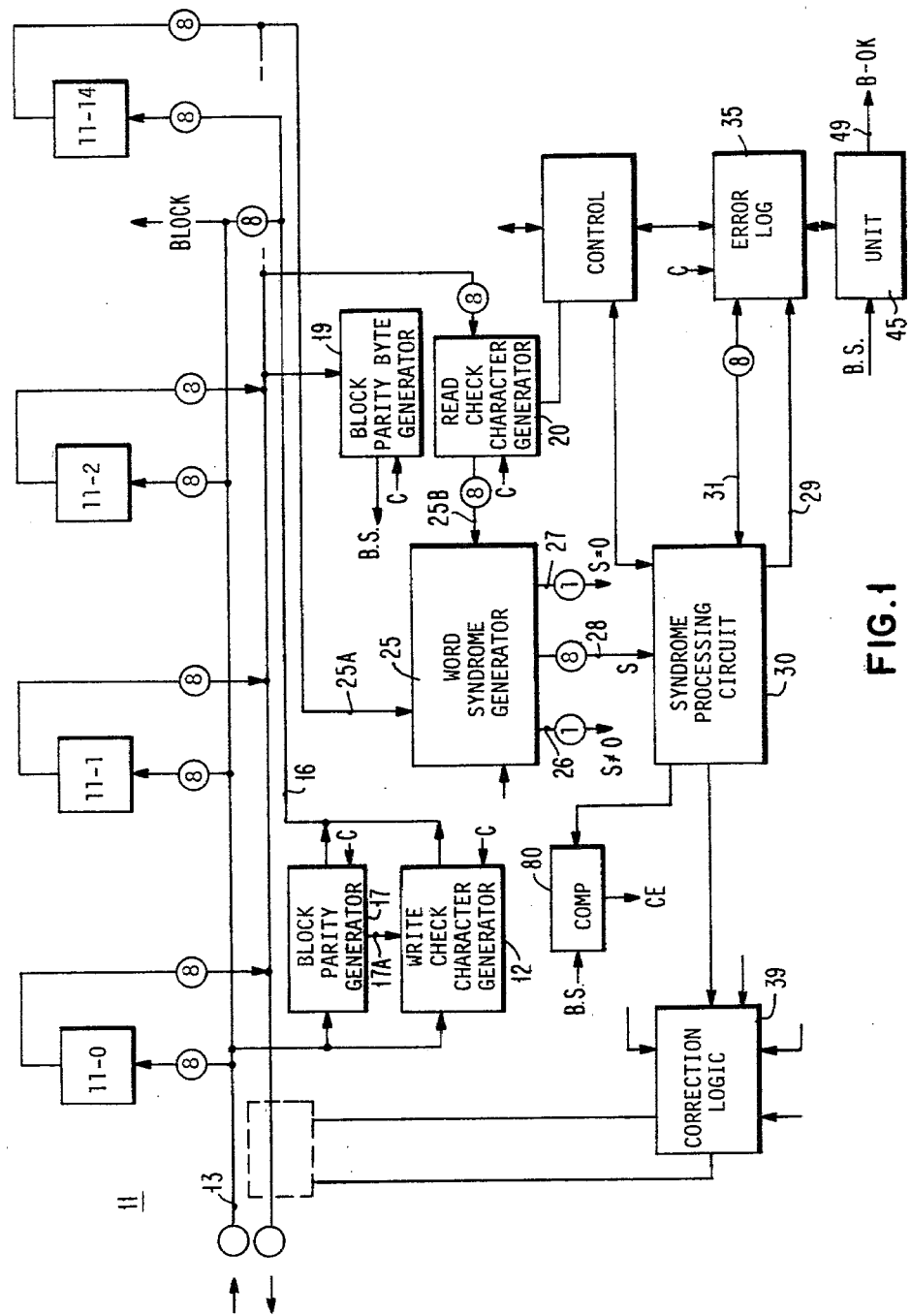
FIG. 1 is a block diagram of the improved dual function ECC system embodying the present invention.

The system shown in FIG. 1 comprises a memory system 11 comprising a plurality of failure independent units 11-0 through 11-14, each of which stores one 8-bit byte from a 15-byte data word, where the first 14 byte positions are employed for data and the 15th byte position is employed for storing a dual function error correcting check character. The dual function check character WCK is generated by the write check character generator 12 as the first 14 bytes of data are supplied to the memory 11 serial by byte on input bus 13. Bus 13 is also connected to the input of generator 12. At the end of 14 data bytes, the newly generated write check character WCK is transferred to memory unit 11-14 which is connected to the output of generator 12 by bus 16.

The system shown in FIG. 1 further includes a block parity byte generator 17 which is also connected to input bus 13. The function of generator 17 is to sum modulo-2 the value of all supplied data bytes assigned to a data block which consists of a relatively large number, such as 40, data words.

Figure 5A:
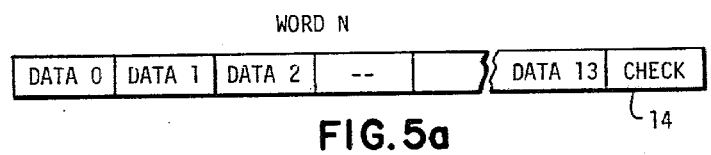
FIG. 5a illustrates the byte position of the ECC check characters WCK in each data word W of the block, except the last data word.
Figure 5B:
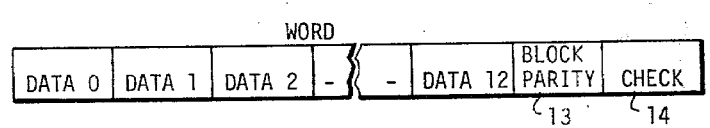
FIG. 5b illustrates the byte position of the block parity byte and the check character WCK in the last word of the block.

The format of the last data word of each 40 word block as stored in memory 11 is modified slightly, as shown in FIG. 5b, since the block parity byte generated by generator 17 is stored in unit 11-13, and the write check character for the 40th word is stored in unit 11-14. The generated block parity byte is treated as a data byte and is supplied to generator 12 on bus 17A so that the write check character does include a contribution from the block parity byte.

The system of FIG. 1 also includes a read check character generator 20 for generating a read check character RCK for each word as data is transferred from memory 11 to the using system. A separate read block parity byte generator 19 is also supplied with all of the data bytes as they are being read out, including the block parity byte stored in byte position 13 of word 40 of the block. The contents of generator 19, at the end of the transfer of a block of data to the using system, represents the sum of error patterns for all errors which occurred in the block of 40 words.

As shown, a separate word syndrome byte generator 25 is also employed in the system of FIG. 1 for generating a syndrome byte S by exclusive-ORing the stored wire check byte WCK with the newly generated read check byte RCK for each word. Syndrome generator 25 has an input bus 25A from memory unit 11-14 for reading the write check character WCK and an input bus 25B from the read check character generator 20 for receiving the read check character RCK at the end of each word.

The syndrome generator 25 has three outputs. Output 26 indicates a non-zero syndrome. Output 27 indicates an all-zero syndrome. Output 28, which is an 8-bit bus, is employed for transferring each non-zero syndrome to the syndrome processing circuit 30.

Syndrome processing circuit 30 is functionally similar to the syndrome processing circuit described in the copending related application referred to earlier in that is processes each non-zero syndrome byte on the assumption that a single random 1-bit error has caused the non-zero syndrome. Since a random single-bit type of error will occur at least three orders of magnitude more often than any other type of error, but still only once in about every 1,000,000 processed words, the syndrome processing circuit will normally operate in the single-bit correcting mode.

Figure 8A:
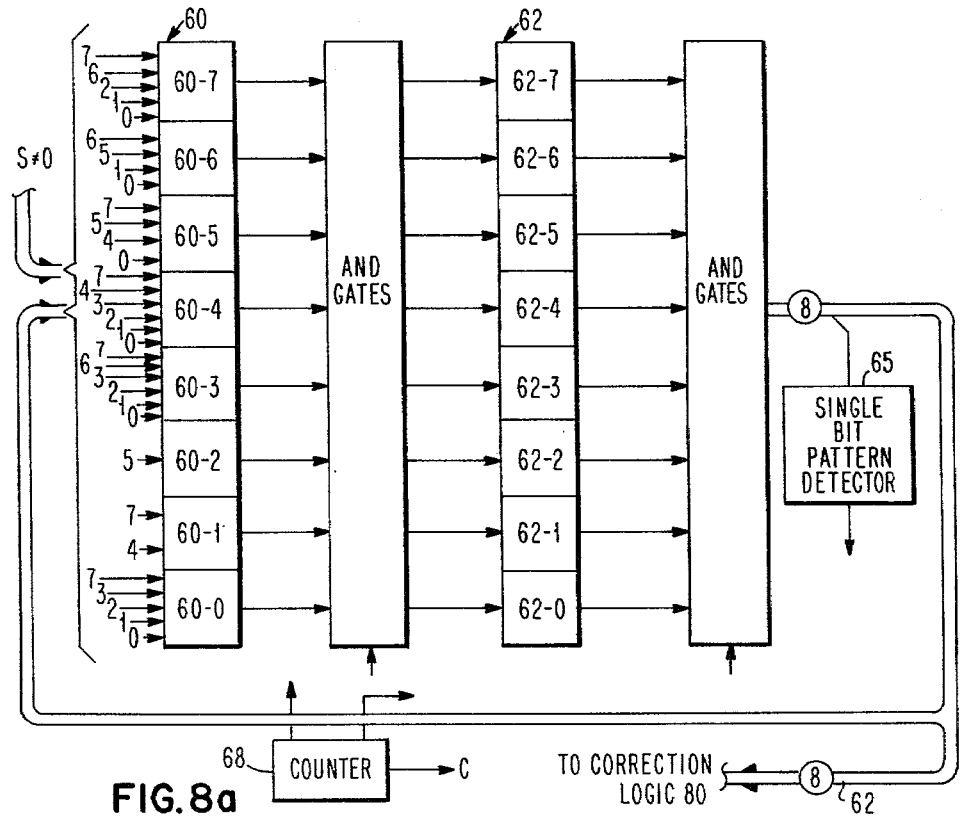
FIG. 8a shows the details of the syndrome processing circuit shown in block form in FIG. 1.

However, since data is handled by the using system in a 40 word block, the system of FIG. 1 is arranged to provide confirmation that none of the single-bit errors that were corrected really represented an error other than a single-bit. The system of FIG. 1, therefore, includes storage unit 35 which functions to log data for each word related to the type of error that may have occurred in that word. Unit 35 stores, as shown in FIG. 8b, the word number, the syndrome S which was generated, the particular single-bit error pattern which was generated by the processing circuit 30, the byte location in the word where the error occurred, and an indication that the byte was corrected.

The system of FIG. 1 also includes a conventional correction unit 39 whose function is to correct the data byte in error based on information, i.e., the error pattern and the byte position, supplied from the syndrome processing circuit 30. Correction unit 39 operates on a word basis so that each single-bit error in each word is corrected at the end of each word as the next word is being read out from memory. At the end of each block of 40 words, all the logged error patterns for that block are summed and compared in unit 45 against the block error pattern syndrome BS which was generated by exclusive-ORing the block parity bytes developed during writing and reading from memory 11. Comparison unit 45 sends a block OK signal on line 49 to the using system.

It should be understood that each single-bit random error that does occur in each word will be corrected. However, there is always the non-zero probability that certain combinations of error conditions may occur which result in a non-zero syndrome byte that is interpreted as a random single-bit error, thereby causing a miscorrection in that data word. The function of unit 45 is to prevent, or at least indicate to the system that that rare situation has occurred.

The above discussion of the general function of the system of FIG. 1 assumed that all of the memory units were operational, and only random single-bit errors were occurring.

As in the related docket and as will be described in detail later on in the specification, the syndrome processing circuit 30 also functions to determine the pattern of a multi-bit error that has occurred in one byte position of a data word when the location of the defective byte is known. When an error occurs in a data word which is not a single 1-bit error, it is assumed that one of the memory units 11 has failed, so that the same byte position in each data word subsequently read out will be defective. It should be understood that a unit has failed if multiple, but not necessarily all, bit positions of a defective byte can produce an error since the bit that is read out may or may not be in error, depending on the value of the bit that was initially stored in that position. It should also be understood that the error patterns for the defective type positions of the data words will generally be different since the error patterns are dependent on the data in that byte position, which presumably varies from word to word.

If, during the reading out of a block of words and the processing of a non-zero syndrome byte for a random single-bit error, the processing is not successful in identifying the location of the single-bit error for that word, the information is logged in column 5 of the error log 35, as shown in FIG. 8b, as an uncorrectable error.

At the end of reading the block, two conditions are checked which suggest that a component may have failed and the logged errors might be the result of other than random single-bit errors.

The first condition that is checked is that the sum of all logged error patterns ΣSBE for corrected single-bit errors is equal to the block syndrome BS. The error patterns for each word may be either accumulated as the words are processed, or alternately, summed from the error log by a suitable means.

The second condition that is checked is that all non-zero syndromes caused a single-bit correction to occur. This may be done by scanning column 5 in the error log at the end of the block. If either condition fails, the block OK signal on line 49 is not sent to the using system, and the syndrome processing circuit 30 then switches to its alternate mode where it initially assumes that the non-zero syndromes that have been logged resulted from the failure of one memory unit 11 and, hence, the same byte position in a number of words may contain a multi-bit error. The task of the processing circuit 30 is then to identify the defective byte position.

The processing circuit 30 functions in a manner generally similar to that described in the related application where the location of a single-bit error was determined by cycling the syndrome through the processing circuit until a pattern having only one bit was detected. In the present system, all of the logged syndrome in log 35 bytes for the words containing errors are also summed to produce the ΣS signal. This may be done by accumulating modulo-2 each non-zero syndrome as the word is processed or by scanning the logged syndrome bytes in column 2 and summing them by any suitable means. The summed syndrome byte designated ΣS is then transferred to the processing circuit 30 which is cycled until a pattern is developed which corresponds to the block syndrome byte BS. The number of cycles taken to reach a comparison is indicative of the defective byte position in each word.

The entire block is then reread from storage or from the using system, and each non-zero syndrome byte in column 2 of the error log is processed to create the appropriate multi-bit error pattern for the defective byte, which may be stored at column 6 of the error log in FIG. 8b. The appropriately developed error pattern for that word is then transferred to correction logic 39 from the syndrome processing circuit 30 or log 35 and the error corrected. The corrected word is then sent to or returned to the using system and the process repeated until all words of the block have been corrected.

As each of the words are processed, any previous corrections made for single-bit errors, as shown in column 3 of log 35, are reversed so that the new error pattern which was developed by cycling the processing circuit based on the word syndrome byte S≠0 in column 2 and the defective byte location data developed previously will result in the proper correction. However, if no mis-correction has occurred, the original correction will be repeated.

The details of the check character generators 12 and 20 and the syndrome processing circuit 30 shown in block form in FIG. 1 will now be described.

WRITE CHECK BYTE GENERATOR

Figure 6:
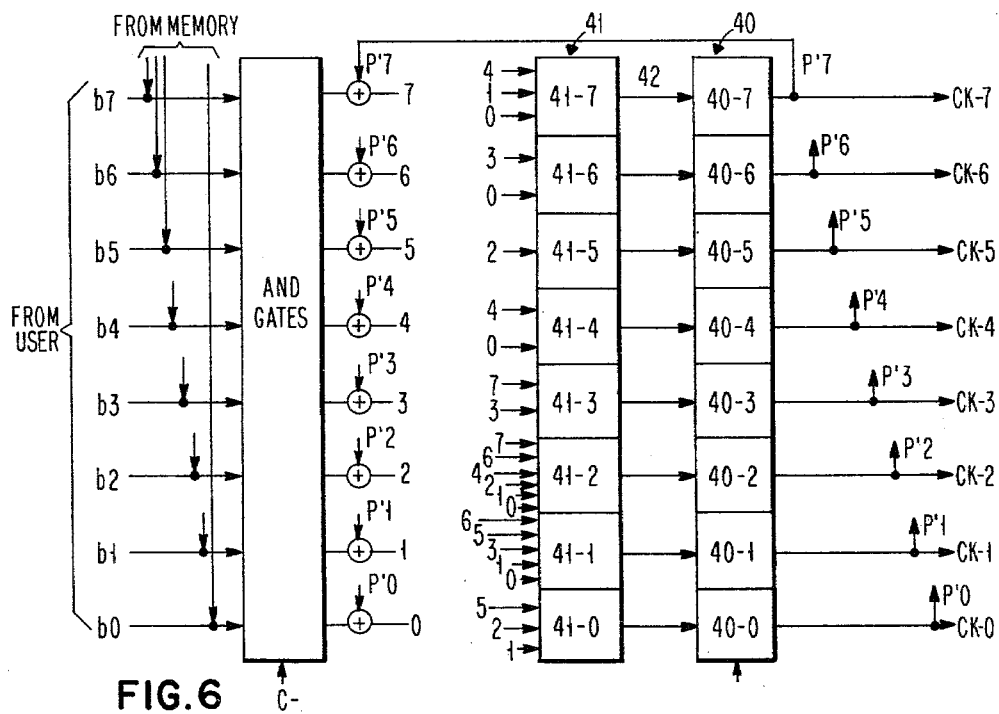
FIG. 6 illustrates the details of the check byte generators shown in block form in FIG. 1.

FIG. 6 represents the detailed circuitry employed in the system of FIG. 1 for generating the write check byte WCK by processing data a byte at a time. Each bit of write check byte WCK represents the modulo-2 sum of the value of bit positions in the data word of M bytes which have been selected from a parity check matrix H′, shown in FIG. 3, which has been developed from a parity check matrix H corresponding to an m-sequence of length $2^b-1$, shown in FIG. 2. Matrix H′ is developed by selecting in FIG. 2 M groups of b columns such that groups are spaced λ-b columns apart in the m-sequence where λ has been selected in the preferred embodiment as 17. The circuitry, as shown in FIG. 6, comprises an eight-stage register 40 and a logic block 41 for each stage having its output 42 connected to the input of each stage of the register and a series of inputs 43 for selecting bit positions of each input byte and corresponding inputs fed back from register 40. Inputs to the logic blocks 41-7 through 41-0 are determined from an 8×8 matrix in the m-sequence of FIG. 2, which is displaced λ columns from the identity matrix IM which begins at column C254. λ was chosen as 17 in the described embodiment so that the matrix shown in Table 1, designated $T^\lambda$ in FIG. 2, corresponds to positions D237 to D230 in FIG. 2.

TABLE 1

| | Data Byte and Register 40 Bit Positions | | | | | | | |
|---|---|---|---|---|---|---|---|---|
| | b7 | b6 | b5 | b4 | b3 | b2 | b1 | b0 |
| P' | | | | | | | | |
| 7 | 0 | 0 | 0 | 1 | 0 | 0 | 1 | 1 |
| 6 | 0 | 0 | 0 | 0 | 1 | 0 | 0 | 1 |
| 5 | 0 | 0 | 0 | 0 | 0 | 1 | 0 | 0 |
| 4 | 0 | 0 | 0 | 1 | 0 | 0 | 0 | 1 |
| 3 | 1 | 0 | 0 | 0 | 1 | 0 | 0 | 0 |
| 2 | 1 | 1 | 0 | 1 | 0 | 1 | 1 | 1 |
| 1 | 0 | 1 | 1 | 0 | 1 | 0 | 1 | 1 |
| 0 | 0 | 0 | 1 | 0 | 0 | 1 | 1 | 0 |
| $T^\lambda$ | | | | | | | | |

The first row of the matrix shows that P'7 checks bit positions b4, b1, and b0; the second row shows that P'6 checks b3 and b0 of the data byte and the register 40, and so forth.

Each logic block 41 functions to "exclusive-OR" all of the inputs. For example, logic block 41-7 which has six inputs, b4, b1, and b0 of the data byte and P'4, P'1, and P'0 (the output of stages R4, R1, and R0 of register 40), could comprise exclusive-OR gates connected in series such that the result is stored in stage 7 of register 40 with the operation being completed in one cycle. Logic blocks 41-6 through 41-0 operate in a similar manner to generate P'6 through P'0. At the end of 14 data bytes or 14 cycles, the write check character WCK has been developed and can be stored in unit 11-14 of memory 11 during the 15th cycle.

The circuitry of FIG. 6, in developing the write check character WCK, performs several logical operations on the data bytes simultaneously during each of its cycles. First, it should be understood that since 14 data bytes are entered serial by byte during the first 14 cycles, the 0th data byte can be considered to be cycled through the generator 14 times, the 1st byte 13 times, etc. The 14th byte (byte 13) is, therefore, only entered once through the generator.

The write check character WCK for any data word is developed, in effect, from the modulo-2 sum of partial check characters PCK developed for each of the 14 bytes of data. The development of each partial check character PCK for a given byte position of data is achieved by processing the associated data byte through the logic blocks 41 and register 40 a number of times related to the position of the byte in the data word. For example, if data byte 0 is recycled through the check byte generator of FIG. 6 13 times after being entered, the resulting pattern corresponds to the partial parity check character PCK-0 for byte 0. If data byte 1 is recycled through the identical circuit 12 times after being entered, the partial parity check character PCK-1 for byte 1 is developed. Data byte 13 is merely entered into the circuits during cycle time 14 once to generate its partial parity check character PCK-13 and is not recycled since it will be seen that the matrix $T^\lambda$, from which the inputs of the logic blocks 41 are determined, corresponds to the matrix associated with byte 13 in FIG. 3. The check generator shown in FIG. 6 operates on the principle that there is a known relationship between the true check character TCK that is generated when the data byte is checked by its associated matrix in FIG. 2 and the bit pattern that is generated when the data byte is checked by a matrix associated with a different byte position, e.g., byte 14. The relationship is such that the position of the true check character in the m-sequence relative to the position of the pattern corresponding to the data byte in the m-sequence will be displaced nλ columns from the position in the m-sequence of the bit pattern developed by the matrix associated with the other byte position.

This can be seen in Table 2 in which it is assumed that the 0th data byte supplied to the check generator was an "×55" pattern, or 1010 1010, and that the remaining 13 bytes of the data word were all 0's.

In Table 2, the column labelled "Bit Pattern" is the value stored in register 40 at the end of each cycle. This value is fed back to the logic blocks 41 during the next cycle to produce a new bit pattern. The second to the last column of Table 2 represents the position in the m-sequence of FIG. 2 of the 8-bit pattern developed during each cycle. The position of the data byte pattern "×55" in the m-sequence of FIG. 2 is position D176, identified by reference numeral 27.

Figure 2:
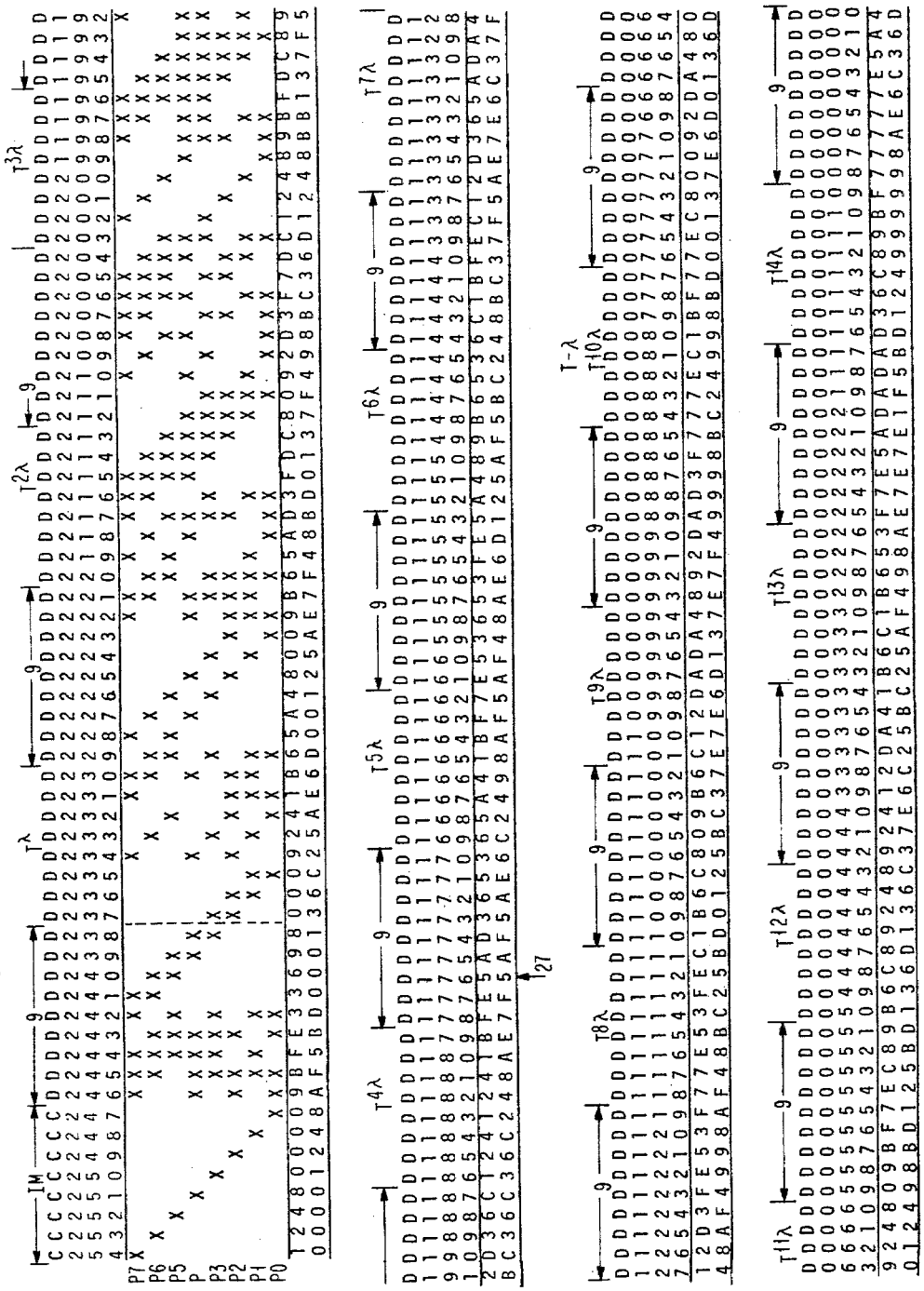
FIG. 2 is a chart showing a parity check matrix H which corresponds to an m-sequence.

The last column of Table 2 expresses the displacement in FIG. 2 from the position D176 of the data byte in terms of a constant factor λ (17) and the byte position.

1010 (×55) and the position of the pattern corresponding to the partial check character PCK-0 is as follows:

$$X - \lambda((M-1) - K) \text{ Mod } 2^b - 1$$

where
X = position of the pattern in m-sequence corresponding to the data byte;
M = number of bytes in a word;
K = byte number;
b = number of bits in a byte.

It can be shown by a table similar to Table 2 that the above relationship exists for any pattern of data in any byte position of the word. It is, therefore, possible to process the data word on a byte basis to generate the write check character WCK.

READ CHECK BYTE GENERATOR

The details of the read check byte generator 20 are identical to the write check byte generator 12 except for the 15th cycle, during which the read check byte is exclusive-OR'd with the write check byte by the syndrome generator logic 25 shown in FIG. 1. Syndrome generator 25 in FIG. 1 receives two 8-bit inputs WCK and RCK. The write check character WCK is supplied on input 25A and the newly developed read check character RCK is supplied on input 25B. The outputs of generator 25 include an all-zero output line 27 and a

TABLE 2

| Byte | Cycle | b7 | b6 | b5 | b4 | b3 | b2 | b1 | b0 | P'7 | P'6 | P'5 | P'4 | P'3 | P'2 | P'1 | P'0 | M-Sequence Position | Displacement |
|---|---|---|---|---|---|---|---|---|---|---|---|---|---|---|---|---|---|---|---|
| 0 | 0 | 1 | 0 | 1 | 0 | 1 | 0 | 1 | 0 | 1 | 1 | 0 | 0 | 0 | 0 | 1 | 0 | 159 | = 176 − ( 1 × 17) |
| 1 | 1 | 0 | 0 | 0 | 0 | 0 | 0 | 0 | 0 | 1 | 0 | 0 | 0 | 1 | 1 | 0 | 1 | 142 | = 176 − ( 2 × 17) |
| 2 | 2 | 0 | 0 | 0 | 0 | 0 | 0 | 0 | 0 | 1 | 1 | 0 | 0 | 1 | 1 | 1 | 1 | 125 | = 176 − ( 3 × 17) |
| 3 | 3 | 0 | 0 | 0 | 0 | 0 | 0 | 0 | 0 | 1 | 0 | 1 | 1 | 0 | 1 | 0 | 1 | 108 | = 176 − ( 4 × 17) |
| 4 | 4 | 0 | 0 | 0 | 0 | 0 | 0 | 0 | 0 | 0 | 1 | 0 | 0 | 1 | 1 | 1 | 1 | 91 | = 176 − ( 5 × 17) |
| 5 | 5 | 0 | 0 | 0 | 0 | 0 | 0 | 0 | 0 | 0 | 1 | 1 | 1 | 0 | 0 | 0 | 0 | 74 | = 176 − ( 6 × 17) |
| 6 | 6 | 0 | 0 | 0 | 0 | 0 | 0 | 0 | 0 | 1 | 1 | 0 | 1 | 1 | 1 | 0 | 1 | 57 | = 176 − ( 7 × 17) |
| 7 | 7 | 0 | 0 | 0 | 0 | 0 | 0 | 0 | 0 | 0 | 0 | 1 | 0 | 0 | 1 | 1 | 1 | 40 | = 176 − ( 8 × 17) |
| 8 | 8 | 0 | 0 | 0 | 0 | 0 | 0 | 0 | 0 | 1 | 1 | 1 | 0 | 1 | 1 | 1 | 23 | = 176 − ( 9 × 17) |
| 9 | 9 | 0 | 0 | 0 | 0 | 0 | 0 | 0 | 1 | 1 | 1 | 0 | 0 | 1 | 0 | 1 | 06 | = 176 − (10 × 17) |
| 10 | 10 | 0 | 0 | 0 | 0 | 0 | 0 | 0 | 1 | 1 | 1 | 1 | 1 | 1 | 0 | 1 | 0 | 244 | = 176 − (11 × 17) Mod 255 |
| 11 | 11 | 0 | 0 | 0 | 0 | 0 | 0 | 0 | 0 | 1 | 0 | 1 | 0 | 0 | 0 | 0 | 227 | = 176 − (12 × 17) Mod 255 |
| 12 | 12 | 0 | 0 | 0 | 0 | 0 | 0 | 0 | 1 | 0 | 0 | 1 | 0 | 0 | 1 | 0 | 210 | = 176 − (13 × 17) Mod 255 |
| 13 | 13 | 0 | 0 | 0 | 0 | 0 | 0 | 0 | 0 | 0 | 0 | 1 | 1 | 1 | 1 | 1 | 193 | = 176 − (14 × 17) Mod 255 |

It can be seen from the first row of the $T^\lambda$ matrix shown in Table 1 that P'7, the modulo-2 sum of the value of the data in positions b4, b1, and b0 is 1 (the register is initially set to all zeros and inputs P'4, P'1, and P'0 have no effect). Similarly, partial parity bit P'6 is the modulo-2 sum of the value of the data in bit positions b3 and b0 which is also equal to 1. A similar operation will show that P'5 is a 0, P'4 is a 0, P'3 is a 0, P'2 is a 0, P'1 is a 1, and P'0 is a 0. The resulting pattern "×38" (1100 0010) is shown on line 1 of Table 2.

Under the above assumption, where only the 0th data byte contains data, the partial check character PCK-0 for byte 0 is equal to the write check character WCK for the word. It can be seen that the partial check character 0001 1111 (×8F) that was developed for byte 0 corresponds to the true check character TCK that would be generated if the same data word had been processed serial by bit or if the data byte "×55" had been applied only to the eight-column matrix associated by byte 0 in FIG. 3.

The relationship in the m-sequence between the position of the pattern corresponding to a data byte of 1010 non-zero syndrome signal line 26, plus an 8-bit bus 28 for transferring the non-zero syndrome byte S≠0 to the syndrome processing circuit 30. These signals are used by other units of the system of FIG. 1.

The generators 12, 20, and 25 include suitable control inputs C to cycle the generators in synchronism with the bytes of data being supplied thereto.

BLOCK PARITY BYTE GENERATORS

Figure 7:
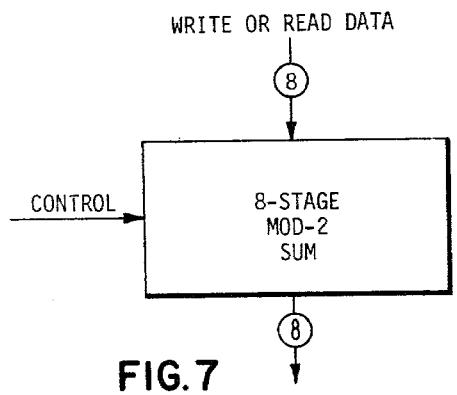
FIG. 7 shows the details of the block parity byte generator shown in FIG. 1.
Figure 4A:
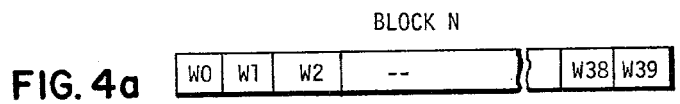
FIGS. 4a through 4c illustrate respectively the block, word and byte formats for the information processed by the system shown in FIG. 1.
Figure 4B:
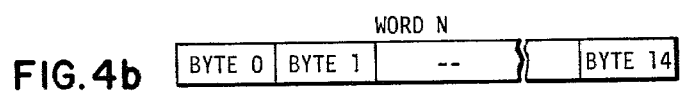
Figure 4C:
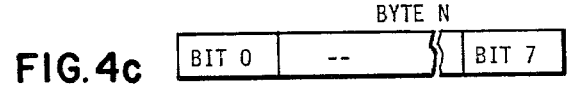

These generators 17 and 19 are shown functionally in FIG. 7 in which any suitable 8-bit modulo-2 summer known in the art may be employed. They also are provided with suitable control inputs C.

SYNDROME PROCESSING CIRCUIT

The syndrome processing circuit 30 in FIG. 1, which functions to process the non-zero syndrome byte for correcting random single-bit errors, also functions to process the same non-zero syndrome byte to determine the particular error pattern when the location in the data word of the byte position containing the mult-bit error is known.

FIG. 8 shows the syndrome processing circuit 30 which comprises an 8-stage register 62 and a logic block 60 associated with the inputs of each stage of the register 62. Each bit of the non-zero syndrome byte S is applied to the corresponding one input of the logic block 60 from generator 25. The output of register 62 is fed back as inputs to each associated logic block 60 through bus 62A. The inputs for each logic block are selected from another matrix $T^{-\lambda}$ shown below in Table 3 which corresponds to positions D016 through D009 of the m-sequence of FIG. 2.

TABLE 3

| Bit Position | D016 | D015 | D014 | D013 | D012 | D011 | D010 | D009 |
|---|---|---|---|---|---|---|---|---|
|  | 7 | 6 | 5 | 4 | 3 | 2 | 1 | 0 |
| 60-7 | 1 | 1 | 0 | 0 | 0 | 1 | 1 | 1 |
| 60-6 | 0 | 1 | 1 | 0 | 0 | 0 | 1 | 1 |
| 60-5 | 1 | 0 | 1 | 1 | 0 | 0 | 0 | 1 |
| 60-4 | 1 | 0 | 0 | 1 | 1 | 1 | 1 | 1 |
| 60-3 | 1 | 1 | 0 | 0 | 1 | 1 | 1 | 1 |
| 60-2 | 0 | 0 | 1 | 0 | 0 | 0 | 0 | 0 |
| 60-1 | 1 | 0 | 0 | 1 | 0 | 0 | 0 | 0 |
| 60-0 | 1 | 0 | 0 | 0 | 1 | 1 | 1 | 1 |
| Hexadecimal | D | 3 | 6 | C | 8 | 9 | B | F |
|  | D | 1 | 2 | 4 | 9 | 9 | 9 | 9 |

$T^{-\lambda}$

Figures 2A, 3:
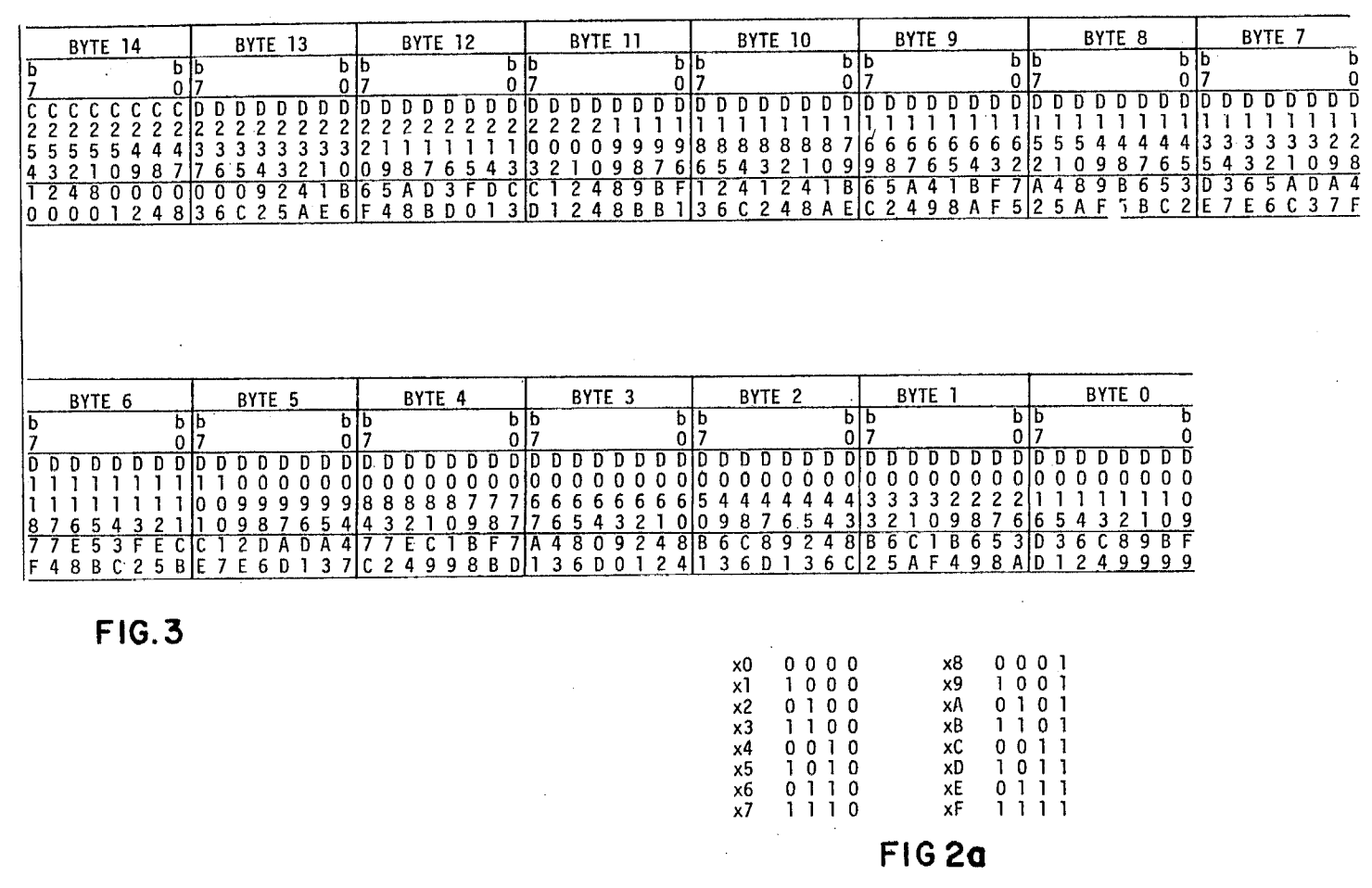

In order for the single syndrome byte S to perform the dual function of correcting single random 1-bit errors, or alternatively, determining the pattern of a multi-bit error in a known erroneous byte, the respective check characters WCK and RCK from which the syndrome bytes are generated were developed in accordance with a parity check table H' similar to that shown in FIG. 3. The parity check table H' is shown in FIG. 3 in hexadecimal notation where, as shown in FIG. 2a, each character 0-F represents a unique pattern of four bits. FIG. 3 is developed from the m-sequence table shown in FIG. 2 by selecting (M) 15 (equally spaced) groups of (b) eight columns, resulting in an 8×120 parity check table. In essence, 120 columns of the table of FIG. 2 have been selected to form the table of FIG. 3. In theory, the number of columns eliminated between each selected group (of eight contiguous columns) could vary between 0 up to a number which would permit 15 groups to be selected which do not overlap. Therefore, λ is equal to or greater than b and Mλ is less than $2^b$ in the preferred embodiment. As shown, the number of columns eliminated in FIG. 2 between each selected group is nine, which simplifies the hardware implementation for developing the matrix H' represented by the table of FIG. 3 from matrix H represented by the table of FIG. 2. It can be shown that the matrix H' has the same single random 1-bit error correcting capabilities as matrix H for a data word consisting of 15 8-bit bytes or 120 bit positions when λ satisfies the equation:

$$(2^b-1)/(2^c-1)$$

where c is an integer.

While conventional serial by bit non-zero syndrome processing steps could be employed, if desired, to correct a single random 1-bit error in each data word, the processing circuit 30 can function to correct both single-bit and multi-bit errors. Since only 120 8-bit permutations of the possible 256 8-bit permutations can be a generated syndrome byte for a single 1-bit random error in a data word, a syndrome byte which does not match with any of the 120 valid error syndromes shown in FIG. 3 is readily detectable and identified on line 29 as an error other than a single-bit error in FIG. 1.

It has been shown in the related application that single random 1-bit errors can be corrected on a byte basis in a manner similar to correcting multi-bit errors in one byte.

Table 4 summarizes the relationships of relative displacements R in the m-sequence of FIG. 2 for single-bit type errors in the first bit position of each byte of a data word.

TABLE 4

| (1) Byte Position | (2) Single-Bit Error Syndrome | (3) Position in M-Sequence | (4) Relative Displacement |
|---|---|---|---|
|  | S — S | | |
|  | 7    0 | | |
| 0 | 1011 1011 | D016 = | 16 + ( 0 × 17) |
| 1 | 1101 0100 | D033 = | 16 + ( 1 × 17) |
| 2 | 1101 1000 | D050 = | 16 + ( 2 × 17) |
| 3 | 0101 1000 | D067 = | 16 + ( 3 × 17) |
| 4 | 1110 0011 | D084 = | 16 + ( 4 × 17) |
| 5 | 0011 0111 | D101 = | 16 + ( 5 × 17) |
| 6 | 1110 1111 | D118 = | 16 + ( 6 × 17) |
| 7 | 1011 0111 | D135 = | 16 + ( 7 × 17) |
| 8 | 0101 0100 | D152 = | 16 + ( 8 × 17) |
| 9 | 0110 0011 | D169 = | 16 + ( 9 × 17) |
| 10 | 1000 1100 | D186 = | 16 + (10 × 17) |
| 11 | 0011 1011 | D203 = | 16 + (11 × 17) |
| 12 | 0110 1111 | D220 = | 16 + (12 × 17) |
| 13 | 0000 1100 | D237 = | 16 + (13 × 17) |
| 14 | 1000 0000 | C254 = | 16 + (14 × 17) |

The table shows in column 4 that the relative displacement in the m-sequence between each successive pair of the 14 syndromes corresponding to a single-bit error in the first bit position in each byte is constant, e.g., 17, and is equal to λ where λ is the sum of the number of bit positions in the byte and the number of columns between groups, i.e., the number of columns that have been skipped in converting the matrix H to matrix H', which in this case was nine. It will be seen that if a single-bit error in the first bit position of byte 10 occurs, by shifting the m-sequence five λ shifts, the correct single-bit error pattern is developed. The same relationships exist for single-bit errors in each bit position of each byte, that is, the correct error pattern for the single-bit error will be developed by shifting the m-sequence (14-K)λ shifts starting with the developed syndrome byte in the m-sequence generator, where K is the number of the byte position in the data word where the error occurred.

Functionally, the syndrome processing circuit 30 can be viewed as producing at the output of register 62 a group or sequence of b bit vectors which are positionally related in the m-sequence to the input syndrome byte, the positional relationship being determined by λ.

A random single-bit error in any byte position of the word can be corrected on a byte basis by counting the number of λ shifts or cycles starting from the position of the syndrome in the m-sequence until a single-bit error pattern is detected. This can be done by conventional logic 65 shown in FIG. 8 looking for a single binary 1. The number of λ shifts subtracted from 14 then identifies the byte position containing the single-bit error pattern. The single-bit error can then be corrected by the system shown in FIG. 1 on a byte basis since the defective byte location and error pattern are known. With reference to FIG. 8, the non-zero syndrome byte is applied to the circuit of FIG. 8 during the 0th cycle and, if the pattern enntered into the register 62 corresponds to a single 1-bit error, the 1-bit pattern logic block 65 indicates this fact on line 70. If the resulting pattern contains more than one 1, a cycle is taken during which the pattern in register 62 is reentered via bus 62A, and so on, until a 1-bit pattern is detected or 15 cycles have occurred. If a single-bit pattern is not detected after 15 cycles, the syndrome initially entered into the circuitry positively does not represent a single-bit error. If, however, after J cycles, a single-bit pattern is found by the single-bit pattern logic 65, the single-bit error is located at the 14-J byte position of the data word. The error connection logic block 39 in FIG. 1 receives the data word serial by byte and, when byte 14-J arrives, it is corrected using the single-bit error pattern detected by block 65.

At this stage of processing, there is no guarantee that the corrective action taken was valid, i.e., that the non-zero syndrome was actually caused by a random single-bit error, since other combinations of error conditions not expected may have caused the non-zero syndrome. The system of FIG. 1, therefore, logs the word number, the byte position, the original syndrome, and the developed error pattern in addition to the fact that the correction was made. Where no single-bit error pattern is found after 15 cycles, the word number and syndrome byte are logged, plus the valid fact that the error was uncorrectable as a single-bit error.

The system of FIG. 1 reads each word of a block of data and attempts to correct, with the syndrome processing circuit of FIG. 8, any non-zero syndrome as if it were a random single-bit error and logs certain information about the error in the error log. At the end of the block of words, i.e., 40 words, the block parity byte accumulated by exclusive-ORing all data bytes of the block is then compared to the stored block parity byte to produce a block syndrome BS which represents the sum modulo-2 of all errors which occurred in each of the 40 words.

As previously discussed, under normal operating conditions only random single-bit errors occur so that the system of FIG. 1, at the end of each block of data, sums the error patterns in log 35 of all corrected single-bit errors and compares this sum with the generated block syndrome BS in unit 45. If there is a comparison, then there have been no miscorrections and the using system is notified that the block of 40 words is valid data by the block OK signal on line 49.

If there is no comparison, even when all non-zero syndromes resulted in single-bit error corrections, the system concludes that an error condition exists in one or more words in the data block that resulted in a syndrome that appeared to be a random single-bit error. Therefore, the error probably was not corrected and, in addition, a valid byte in one or more words of the block was probably miscorrected. The using system is notified of this fact and the ECC system assumes presence of a defective byte and proceeds to determine the defective byte location.

Also, if the data log shows that there was one or more uncorrectable single-bit errors, the system proceeds to determine the defective byte location on the assumption that, if there were more than one uncorrected error logged, each logged error is in the same byte location of the words.

MULTI-BIT ERROR CORRECTING

The circuit of FIG. 8 functions to first locate the defective byte position in the data word and then, with the defective byte location information, develop the correct multi-bit error pattern for the defective byte of each word.

In the related application, it was shown that multi-bit errors of the same type which occur in different byte positions of a data word are related positionally in a known manner in the m-sequence of FIG. 2, depending on the value of λ and the position of the defective byte in the word. Stated differently, the set of 15 unique syndrome bytes that would be generated from the same error pattern if it occurred in each byte position of the word would be spaced in the m-sequence of FIG. 2 λ columns apart.

Table 5 represents the set of syndrome bytes for a double error in bit positions 7 and 6 of each byte of the word. The syndrome byte for this type of error is developed merely by the modulo-2 addition of the single-bit error syndrome bytes for the respective bit positions in error. For example, in FIGS. 2 or 3, byte 14, bits 7 and 6 in error, the syndrome 1100 0000 in Table 5, line 14, is the modulo-2 sum of 1000 0000 and 0100 0000 and is located at position D241 in the m-sequence of FIG. 2.

TABLE 5

| Byte Position | 2-Bit Error Syndrome Bits 7 & 6 S S 7 6 | Position in M-Sequence | Relative Displacement |
|---|---|---|---|
| 0 | 0111 0110 | D03 | = 3 + ( 0 × 17) |
| 1 | 1011 1000 | D20 | = 3 + ( 1 × 17) |
| 2 | 1011 0100 | D37 | = 3 + ( 2 × 17) |
| 3 | 0111 0100 | D54 | = 3 + ( 3 × 17) |
| 4 | 0000 0111 | D71 | = 3 + ( 4 × 17) |
| 5 | 1011 1001 | D88 | 3 + ( 5 × 17) |
| 6 | 0000 1101 | D105 | = 3 + ( 6 × 17) |
| 7 | 0111 1001 | D122 | = 3 + ( 7 × 17) |
| 8 | 0111 1110 | D139 | = 3 + ( 8 × 17) |
| 9 | 1100 0111 | D156 | = 3 + ( 9 × 17) |
| 10 | 1100 1010 | D173 | = 3 + (10 × 17) |
| 11 | 1011 0110 | D190 | = 3 + (11 × 17) |
| 12 | 1100 1101 | D207 | = 3 + (12 × 17) |
| 13 | 0000 1010 | D224 | = 3 + (13 × 17) |
| 14 | 1100 0000 | D241 | = 3 + (14 × 17) |

Since the relationships set forth in Table 5 exist for identical type error patterns in different bytes, either the correct error pattern can be developed when the defective byte location is known, or the location of the defective byte position can be determined if the correct error pattern is known.

The syndrome processing circuit, therefore, includes a conventional comparator 80 which compares the contents of register 62 with the block parity syndrome BS. For purposes of explanation, it will be assumed that during the reading of the 40 word block, all errors that occurred are in the same byte position of a data word. The block parity syndrome byte BS, therefore, represents the sum modulo-2 of these errors. If individual non-zero syndrome bytes that are generated for each word stored in the error log are summed modulo-2 to produce a summed syndrome byte $\Sigma S \neq 0$, the summed syndrome byte and the block parity syndrome BS can be used by circuit 30 of FIG. 8 and comparator 80 to determine the defective byte location. The system of FIG. 1, therefore, includes means in the error log for summing all the individual syndrome bytes and for transferring the summed syndrome byte to the processing circuit of FIG. 8 and to comparator 80.

The summed syndrome byte ΣS is entered into the circuit of FIG. 8 and cycled 15 times. A set of patterns for that type of syndrome byte will appear in register 62 during the 15 cycles. If the type of error pattern is known, i.e., BS, the contents of register 62 at the end of each cycle can be compared in comparator 80 against the known error pattern. The number of cycles which occur before a compare/equal signal CE is generated by the comparator 80 is related to the location in the word of the defective byte position.

Means are, therefore, provided to transfer the block parity syndrome byte to comparator 80 and suitable controls (not shown) to cycle the summed syndrome ΣS≠0 in the syndrome processing circuit at least 15 times or until a CE signal is provided by comparator 80. The location of the defective byte (14-K), as determined by the number (K) of cycles taken before the CE signal is generated, is then stored in column 7 of the error log.

The system is then in a position to process each logged non-zero syndrome byte in the syndrome processing circuit 30 to develop an error pattern for each word that will correct the erroneous data in the defective byte position of that word. The system functions to transfer the syndrome byte S≠0 in column 2 of the error log to the syndrome processing circuit 30 via bus 31, cycle the processing circuit a predetermined number of cycles related to the known defective byte position, and transfer the resulting pattern back to column 6 of the log via bus 31 as the correct error pattern.

The information needed to correct all errors in the block can be sent to the using system or the memory reread and the correction applied as each word is reprocessed.

The description of the system addressed the processing of a block of data words where all errors were either single random 1-bit errors in the words or all multi-bit errors in the same defective byte position of each word. The operation of the system is summarized in flow chart form in FIG. 9.

Figure 9:
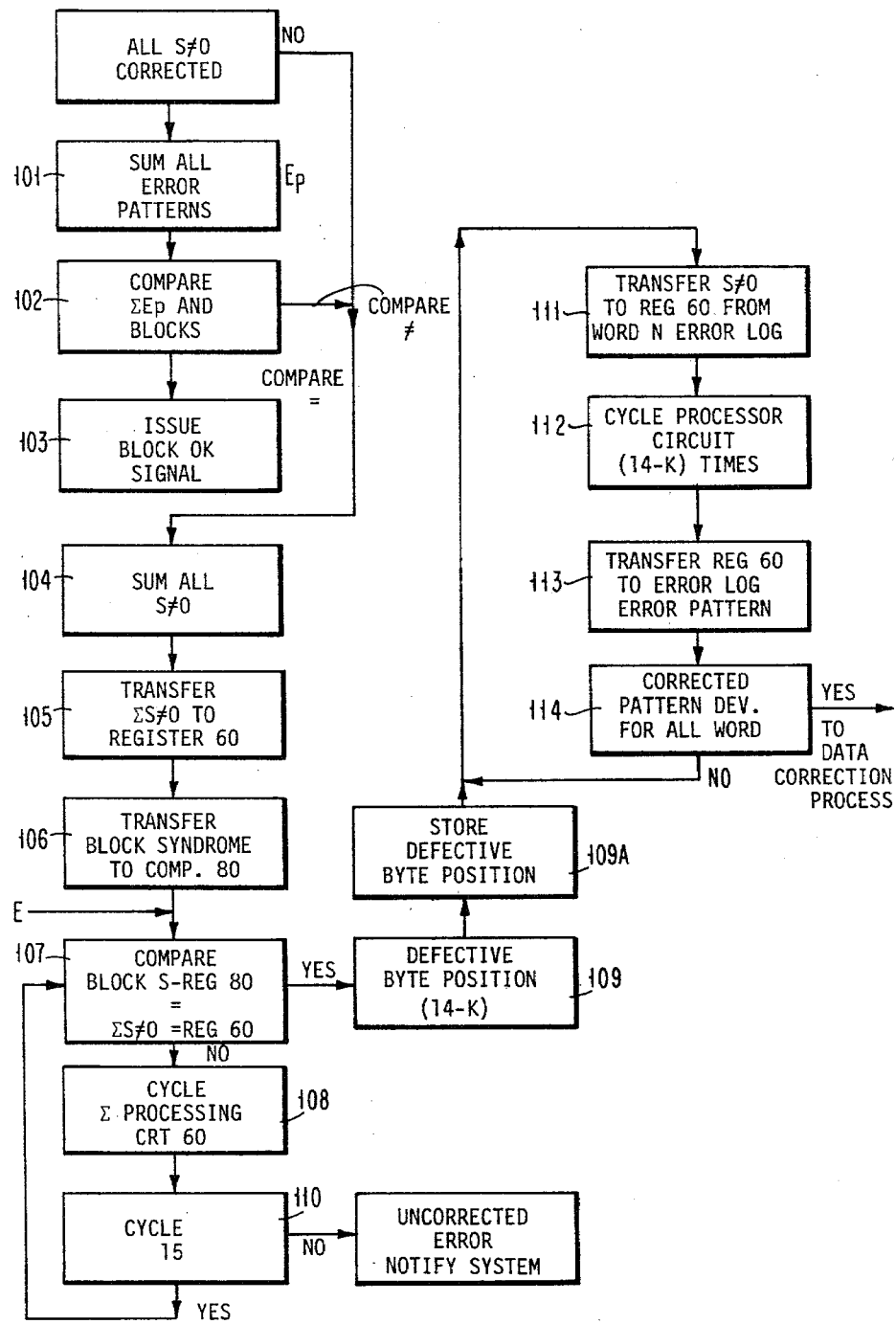
FIG. 9 is a flow chart of the steps involved in processing a block of data words containing various types of error conditions.

The following examples of specific error conditions in a block of data will illustrate the operation of the system as shown by the flow chart in FIG. 9. Assume that in the block of 40 data words being processed, data words 1, 2 and 3 contain the following single-bit error pattern in the byte indicated and that all other data words are all zeros.

TABLE 6

| Word Number | Error Pattern | Byte Location | S≠0 |
|---|---|---|---|
| 1 | 1000 0000 | 4 | 1110 0011 |
| 2 | 0000 1000 | 8 | 1101 1010 |
| 3 | 0000 0010 | 5 | 0101 1100 |

During processing of word 1, the non-zero syndrome pattern S≠0 was placed in register 62 and cycled until a 1-bit pattern was detected. The number of cycles 10 was converted to byte position and logged along with the error pattern existing at that time. The word was then corrected, and the fact that it was corrected was logged in the error log. A similar set of steps during processing of words 2 and 3 occurred. The remaining words, which were all zeros, were processed and, since they contained no errors, did not affect the block parity syndrome byte BS which was generated and stored at the end of the 40 word block.

The block parity syndrome BS would have the following pattern: 1000 1010. The system then sums as per block 101 in FIG. 9 all the error patterns and stores the result 1000 1010 in the log. The summed error pattern is then compared as per block 102 with the block parity syndrome in comparator 80 and, since they are equal, a block OK signal is issued in step 103.

The next example illustrates a situation in which a block of data words contains three words, each having an error which produced non-zero syndromes which were, during the processing of each syndrome, interpreted as a single-bit error. Assume word 1 has a 1000 1000 error in byte position 9 and word 2 has a 1111 1111 error in byte position 9 and word 3 has a 1110 0010 error in byte position 9. As each word was processed, the non-zero syndrome byte that resulted was interpreted as a single-bit error in the byte position indicated in Table 7.

TABLE 7

| Word Number | Real Error Pattern | Byte Position | Developed Error Pattern | Indicated Byte Position | S≠0 |
|---|---|---|---|---|---|
| 1 | 1000 1000 | 9 | 0100 0000 | 6 | 1110 0010 |
| 2 | 1111 1111 | 9 | 0000 0010 | 4 | 1111 1101 |
| 3 | 1110 0010 | 9 | 0100 0000 | 1 | 0110 1010 |
| BS | 1001 0101 |  | Σ 0000 0010 |  | Σ 0111 0101 |

The block parity syndrome BS would have the following pattern, which is the sum of the real error patterns: 1001 0101. The sum of the stored error patterns computed by step 101 is 0000 0010. The comparison conducted in step 102 failed so that the block OK signal is not generated, but the system then knows that the errors were miscorrected as single-bit errors and then assumes that the errors were all multi-bit errors in the same byte position of each word. The next step is to sum all syndrome bytes as per block 104 which results in a 0111 0101 pattern. That pattern is then transferred to register 62 by step 105 while the block syndrome byte BS 1001 0101 is transferred to comparator 80 in step 106 and compared in step 107. The processing circuit is then cycled by step 108 until the comparator 80 indicates a match which, under the present assumptions, will occur after five cycles. This can be seen by referring to FIG. 2 where the summation of the syndrome bytes 0111 0101 (xEA) is found in position D161 of the matrix and the block parity syndrome 1001 0101 (×9A) is found at D246 spaced 5λ (85) columns from the summation of the syndrome bytes. With the defective byte position now identified by step 109 as position 9 (14-5), the system proceeds to find a correct error pattern for the 9th byte position of words 1, 2 and 3 by proceding through steps 111 through 114. All correct error patterns are stored by step 113 in the log as generated. The previously miscorrected errors are reversed and the new corrections applied, either by the system or by suitable correction circuitry.

If, in the previous example in steps 108 and 108A, the processing circuit had cycled more than 14 times without a match in comparator 80, an uncorrectable error signal would have been sent to the system in step 10.

The last example involves five words of the block, each having an error in byte position 9 of the word, as shown below in Table 8.

TABLE 8

| Word Number | Syndrome | Logged Pattern | Position | Correct | Defective Byte | Real Error |
|---|---|---|---|---|---|---|
| 1 | 1110 0010 | 0100 0000 | 6 | Y | 9 | 1000 1000 |
| 2 | 1111 1101 | 0000 0010 | 4 | Y | 9 | 1111 1111 |
| 3 | 0001 1010 | — | — | N | 9 | 0100 1101 |
| 4 | 0111 0100 | — | — | N | 9 | 0111 1110 |
| 5 | 0000 1101 | — | — | N | 9 | 1011 0011 |
| ΣS | 0111 1100 | | | | | 1111 0111 |

The error in words 1 and 2 result in syndrome bytes which are interpreted initially as single-bit errors. However, the test conducted by step 102 at the beginning of the block processing operation fails, in addition to the fact that three non-zero syndrome bytes for words 3, 4 and 5, respectively, were logged as potentially uncorrectable errors. However, the sum of the error syndromes ΣS (0111 1100) and the block parity syndrome (1111 0111) are employed to locate the defective byte position as byte position 9 of each word. The real error patterns will then be decoded from the respective syndromes, as previously mentioned.

For example, in the preferred embodiment, the block parity byte was generated by merely summing modulo-2 the value of the data bits in corresponding bit positions of each data byte of the word. If desired, the block parity byte may be generated by any other known linear function which selects specific bit positions to be summed in some systematic manner. For example, a check character generator similar to that employed for generating the read and write check characters for the data words could be employed. The syndrome processing circuits of the system of FIG. 1, employed to determine the defective byte position, would then be modified to reflect the specific linear function selected. The overall system operation, however, would not be changed.

The block size of 40 words, as employed in the preferred embodiment, is merely representative. The block size, in practice, would be selected by error characteristics of the memory system and other system considerations and, if desired, need not be constant provided that, for any block, the number of data words in that block is known.

Lastly, it can be shown that in the preferred embodiment described, where λ was selected as 17, an additional feature is obtained in that it is possible to detect, but not correct, the occurrence of two random 1-bit errors which occur in different byte positions of any one word in a block. It will be seen by inspection of the m-sequence of FIG. 2 that the modulo-2 sum of any two single-bit error syndromes which are in different byte positions of the data word results in a syndrome having a pattern which always corresponds to a position in the m-sequence which is not related to the block syndrome by any one of the 0 to 14 λ shifts. That is, the position in the m-sequence of the resulting 2-bit error syndrome will always be other than λ(14-K) positions away from the position of the block syndrome in the m-sequence. Thus, there is no possibility of a random 2-bit error producing a syndrome that corresponds to a multi-bit error in one byte. This discovery permits the system to conclude that two random 1-bit errors have occurred in different byte positions of a word by the following logic:
1. The single-bit processing steps will conclude that a valid single 1-bit error has not occurred since:
   a. The block parity byte will be all zeros if the two random bit errors occurred in the same bit position of different bytes of the word; or
   b. The block parity byte will reflect the sum of the two random bit errors and exactly two 1's will be present in the error pattern;
2. The processing circuit for multi-bit errors will indicate, by cycling 15 times, that a multi-bit error in one byte did not occur;
3. The possibility of two modules failing during the time it takes to process one block of words is theoretically not zero, but is too remote to consider in a practical sense;
4. The possibility of more than two random 1-bit errors occurring in the time it takes to process one block of words is also theoretically non-zero, but is also too remote to consider in a practical sense.

Therefore, in every case of two random 1-bit errors in one word, the system will conclude that the error is neither a random 1-bit error nor a multi-bit error in one byte.

While the invention has been particularly shown and described with reference to a preferred embodiment thereof, it will be understood by those skilled in the art that various changes in the form and details may be made therein without departing from the spirit and scope of the invention.

Having thus described my invention, what I claim as new and desire to secure by Letters Patent is:

1. In a dual function ECC system for alternately correcting from a single syndrome byte random 1-bit errors in a data word having M-1 data byte positions and one check byte position, or multi-bit errors in the same byte position of successive data words, where corresponding bytes of successive data words are each stored in a failure independent storage unit and where each said syndrome byte is developed from a write check character and a read check character where each bit position of said check characters represents the modulo-2 sum of the value of data in bit positions of a data word which have been selected from a parity check matrix H' derived from a parity check matrix H which corresponds to an m-sequence of length $2^b-1$ where b is equal to the number of bit positions in each said byte, said H' matrix being derived by selecting M b×b submatrices from said H matrix which are spaced apart λ-b columns, where λ is greater than b and is selected such that none of the selected submatrices overlap, and means for generating said syndrome byte for each word, said system including:
   (a) a syndrome processing circuit having an input and an output and operable to provide at said output a sequence of different b bit vectors, each vector being positionally related in said m-sequence to said syndrome byte by a factor Kλ where K is the position number in said sequence;
   (b) means for transferring each non-zero syndrome byte to said processing circuit; and
   (c) means responsive to the output of said processing circuit to indicate the byte location and error pattern of a random single-bit error in said data word and for correcting said error, the improvement comprising:
   (1) means for logging the indicated byte location, the single-bit error pattern, and said non-zero syndrome byte for each processed word where a correction was made for a predetermined number of processed words;

(2) means for generating a write block check character, a read block check character, and a block syndrome byte from said block check characters which is related by a linear function to the sum of all errors which occurred in the data byte positions of said predetermined number of processed words;

(3) a comparator; and (4) summing means to provide a summed error pattern byte from all said single-bit error patterns; said comparator being operable at the end of each said block of words for comparing said block syndrome byte with said summed error pattern byte to confirm the validity of each said single-bit error pattern correction.

2. The system recited in claim 1 in which said processing circuit provides a first signal indicating that said input syndrome byte does not represent a single random 1-bit error, and said improvement further includes means responsive to said first signal for logging said word number, said syndrome byte, and an indication that said word contains an error that is not a random single-bit error.

3. The system recited in claim 2 in which said improvement further includes means for selectively providing to said processing circuit the modulo-2 sum of the non-zero syndrome bytes for all words of a block, means for selectively providing to said comparator said block syndrome byte, and means including said comparator for generating a signal K' indicating the position of said block syndrome byte in said sequence of b bit vectors provided by processing said summed syndrome byte in said processing circuit and which is indicative of a failed unit.

4. The system recited in claim 3 in which said improvement further includes means for transferring from said error log to said processing circuit a non-zero syndrome byte for each word and means for transferring from the output of said processing circuit one of said b bit vectors selected from said sequence generated from said non-zero syndrome byte in accordance with the value of signal K' as the error pattern required to correct the error in the byte position in said associated word related to said failed unit.

5. The system recited in claim 4 in which said error pattern required to correct said error is transferred to said error log.

6. The system recited in claim 5 in which said improvement further includes means for reprocessing each said word having an error to reverse any previous correction made in accordance with the syndrome byte and correct an error existing in the defective byte position.

7. The system recited in claim 6 in which $\lambda$ is equal to $2^b - 1/2^c - 1$ for some integer c to provide a double error detection capability.

8. The system recited in claim 7 in which $\lambda$ is 17 and said m-sequence is generated from any primative polynomial of degree b.

9. The system recited in claim 8 where each block comprises a plurality N of data words, each of which includes 15 byte positions, all said words including check character positions and said Nth word including a block parity byte position.

10. The system recited in claim 9 in which N is selected in accordance with the error characteristics of the memory system.

11. The system recited in claim 10 in which said failure independent storage units each comprise a bubble memory module, each of which has b bubble chips.

12. The system recited in claim 11 in which a random single-bit error occurs on a probability basis in one word in every $10^8$ words read from said modules.

13. The system recited in claim 12 in which the possibility of one of said modules failing is several orders of magnitude lesser than $10^8$.

14. In a method for processing a b bit syndrome byte where said syndrome byte is one of M vectors which are positionally related in an m-sequence of length $2^b-1$ to alternately correct a random single-bit error in one of M byte positions of data word or a multi-bit error in the same byte position of successive said words, and where each non-zero syndrome byte is processed to determine the byte location of a single-bit error and the single-bit error pattern, the improvement comprising the steps of:

generating a block syndrome byte for a block of said words by exclusive-ORing a write block check byte and a read block check byte where said block syndrome byte represents the modulo-2 sum of all errors that have occurred in each word of said block;

summing modulo-2 all error patterns determined by processing said each non-zero syndrome byte to produce a summed error pattern byte; and comparing said block syndrome byte with the summed error pattern byte to validate each said single-bit error pattern determined by said processing circuit.

15. The method recited in claim 14 further including the steps of summing each non-zero syndrome byte modulo-2 if said block syndrome byte does not compare with said summed error pattern byte, determining the positional relationship in said m-sequence between said summed syndrome byte and said block syndrome byte and employing said determined positional relationship to determine the error pattern by selecting from each set of b bit vectors associated with each non-zero syndrome byte the b bit vector having the same positional relationship in the set relative to said syndrome byte.

16. The method recited in claim 15 in which said positional relationships in said m-sequence are defined in accordance with the relationship of the parity check matrix H' on which said non-zero syndrome byte for each word is based and a parity check matrix H which corresponds to said m-sequence.

17. The method recited in claim 16 in which the said positional relationship of each of said M vectors in said m-sequence is a spacing of $\lambda$ columns from one vector to the next vector where $\lambda$ is equal to $2^b - 1/2^c - 1$ for some integer c.

18. The method recited in claim 17 in which said syndrome byte represents the modulo-2 sum of a write check byte and a read check byte, each of which represent the modulo-2 sum of the value of data in selected bit positions of a data word having M byte positions, said bit positions being selected in accordance with said parity check matrix H' having Mb columns and b rows.

19. The method recited in claim 18 in which said matrix H' consists of M b×b submatrices selected from said m-sequence such that each submatrix is spaced in said m-sequence 17−b columns from an adjacent submatrix and where one of said submatrices corresponds to the identity matrix of said m-sequence.

20. A dual function ECC system having a write check character generator, a read check character generator, a syndrome generator responsive to the output of said check generators, and a syndrome processing circuit for correcting a single random 1-bit error in each multi-byte data word for which said syndrome generator produces a non-zero syndrome byte characterized by:
  (a) an accumulator for providing a parity byte by summing modulo-2 each byte of data from a block of data words, said parity byte corresponding to the sum modulo-2 of all errors in said block;
  (b) means for summing modulo-2 the error patterns produced by said syndrome processing circuit to correct a single-bit error in each word;
  (c) a comparator responsive to said parity byte and said summed error patterns to indicate if all of said non-zero syndrome bytes represent valid 1-bit errors and that no miscorrection has occurred by determining the positional relationship of the one b bit vector having a single binary 1 from a set of b bit vectors that are positionally related to said syndrome byte in an m-sequence of length $2^b-1$; and
  (d) means operable when a miscorrection has occurred to correct multi-bit errors in the same byte position of each word by selecting one b bit vector from each said set of b bit vectors which has the same positional relationship relative to its associated syndrome byte as said block syndrome byte has relative to the sum modulo-2 of said syndrome bytes in said m-sequence.

* * * * *